United States Patent
Brunheroto et al.

(10) Patent No.: US 7,617,509 B1
(45) Date of Patent: Nov. 10, 2009

(54) METHOD AND SYSTEM FOR AUTOMATED MONITORING OF QUALITY OF SERVICE OF DIGITAL VIDEO MATERIAL DISTRIBUTION AND PLAY-OUT

(75) Inventors: Jose R. Brunheroto, Mohegan Lake, NY (US); Eric Hsiao, San Mateo, CA (US); Peter S. Lee, Calabasas, CA (US); Frank A. Schaffa, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1392 days.

(21) Appl. No.: 09/602,278

(22) Filed: Jun. 23, 2000

(51) Int. Cl.
*H04N 60/32* (2006.01)
*H04M 11/06* (2006.01)

(52) U.S. Cl. .......................... 725/19; 725/20; 370/241
(58) Field of Classification Search ................ 725/107, 725/22, 19, 20, 110
See application file for complete search history.

(56) References Cited

U.S. PATENT DOCUMENTS

| | | | | |
|---|---|---|---|---|
| 4,025,851 | A * | 5/1977 | Haselwood et al. | 725/22 |
| 4,230,990 | A * | 10/1980 | Lert et al. | 725/22 |
| 4,739,398 | A | 4/1988 | Thomas et al. | |
| 5,019,899 | A | 5/1991 | Boles et al. | |
| 5,319,453 | A * | 6/1994 | Copriviza et al. | 346/6 |
| 5,574,495 | A * | 11/1996 | Caporizzo | 725/107 |
| 5,621,454 | A | 4/1997 | Ellis et al. | |
| 5,826,165 | A * | 10/1998 | Echeita et al. | 725/22 |
| 6,173,271 | B1 * | 1/2001 | Goodman et al. | 705/40 |
| 6,570,996 | B1 * | 5/2003 | Linnartz | 382/100 |
| 6,597,405 | B1 * | 7/2003 | Iggulden | 348/553 |

* cited by examiner

*Primary Examiner*—Dominic D Saltarelli
(74) *Attorney, Agent, or Firm*—Sawyer Law Group, P.C.

(57) ABSTRACT

Method and system aspects provide for automated monitoring of quality of service of digital video material being distributed and played. The aspects include embedding a signature in each frame of the digital video material by a program source device control. Computation of play-out statistics for the digital video material based on the signature by a program play-out device control is also included.

20 Claims, 1 Drawing Sheet

METHOD AND SYSTEM FOR AUTOMATED MONITORING OF QUALITY OF SERVICE OF DIGITAL VIDEO MATERIAL DISTRIBUTION AND PLAY-OUT

FIELD OF THE INVENTION

The present invention relates to a method for measuring the quality of service and the duration of a given digital video program that has been transmitted, including in the compressed domain (e.g., MPEG-2 PES level).

BACKGROUND OF THE INVENTION

When distributing video material over cable channels, satellite, or air waves, it is necessary to measure the quality of service of the distribution system. Quality of service of distribution is measured according to whether the video material was delivered in whole and on time and to the proper location/audience. For example, advertisers that play video material over television or cable channels need to verify that their shows, commercials or spots actually play to air. Companies also need to monitor and track video (digital or analog) files as well as perform certain tasks based on the usage of the video file (e.g., billing royalties based on video use). Today, there are a few methods to perform this validation.

In current distribution environments, i.e., analog environments, monitoring distribution of video material, whether compressed (digital) or uncompressed (analog), for quality of service relies on techniques that utilize significant manual human activities. These methods include:

1. Taping the day's programs and then having a person review the tape to see that the material played.
2. Using industry groups (e.g., Neilsen) that have employees literally watch TV to see that the material plays. These people enter the information on paper. This information is then consolidated and reports are sent back to the advertisers.
3. Using video detectors that can detect loss of signal, but can't typically tell if the video is playing correctly or not.
4. Tracking the location and path that files are distributed.

These approaches are not very reliable and are time consuming. Furthermore, these approaches require a long time between validation and correlation at the program source/ad agency.

Accordingly, a need exists for a more efficient and automated manner of verifying the quality of service of video material being distributed and played, particularly in the compressed domain. The present invention addresses such a need.

SUMMARY OF THE INVENTION

The present invention provides method and system aspects for automated monitoring of quality of service of digital video material being distributed and played. The aspects include embedding a signature in each frame of the digital video material by a program source device control. Computation of play-out statistics for the digital video material based on the signature by a program play-out device control is also included.

Through the present invention, determining statistics on a particular video program occurs in a manner that avoids intensive manual human monitoring and provides a more efficient and automatic ability to achieve quality of service measurements. The present invention utilizes technology to embed hidden data into a video or associate data with the video file, and provides the ability to take correlated hidden data and video images together that an application can then process to do applications such as billing, quality of service measurements, rights management, and external device control. These and other advantages of the aspects of the present invention will be more fully understood in conjunction with following detailed description and accompanying drawings.

DETAILED DESCRIPTION

The present invention relates to method and system aspects for automated monitoring of the quality of service of digital video material distribution and play-out. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
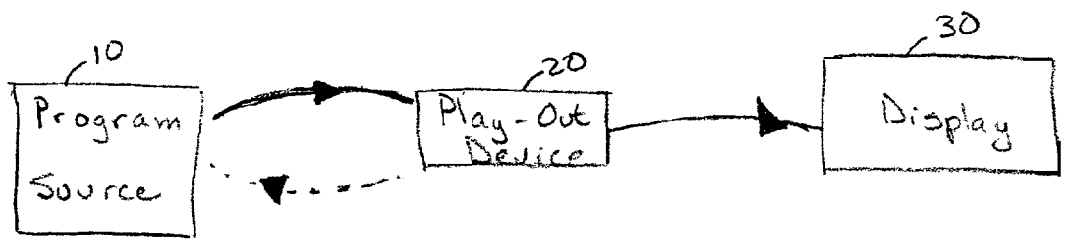
FIG. 1 illustrates a block diagram of a digital video distribution system in accordance with the present invention.
Figure 2:
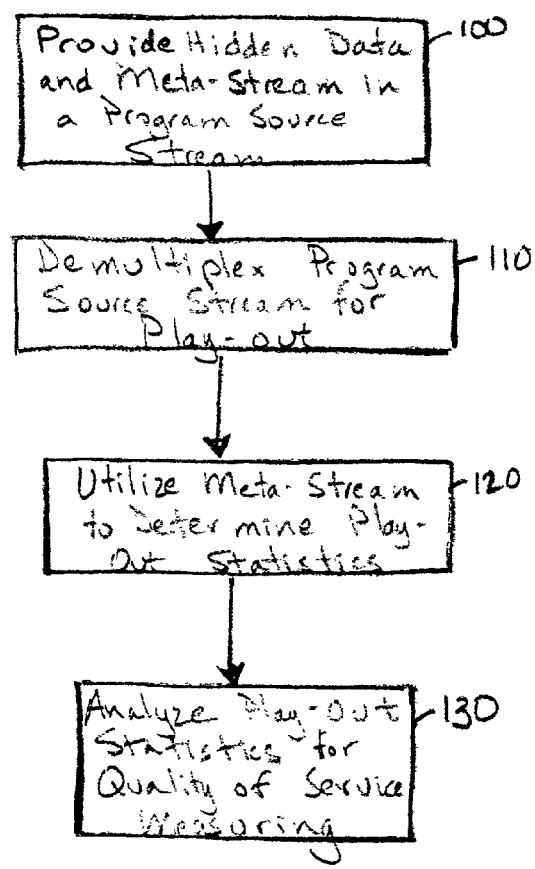
FIG. 2 illustrates a block flow diagram of automated quality of service monitoring in the system of FIG. 1 in accordance with the present invention.

FIGS. 1 and 2 present a block system diagram and a block flow diagram, respectively, of a preferred embodiment of the present invention for automated monitoring of quality of service of digital video material distribution and play-out. Digital video material is provided from a video program source 10 for inclusion with a program feed, e.g., a satellite program feed, a cable feed, or a terrestrial feed. The digital video source material is encoded (e.g., at a central location associated with the program source 10) with hidden data (step 100). Preferably, the hidden data includes a signature computed by a chosen hashing function, e.g., CRC for each frame belonging to the digital program material. By way of example, a digital advertisement or Ad, that lasts 30 seconds and is played at 30 fps (frames per second) contains 900 frames; for each frame, an individual signature is computed, thus resulting in 900 signatures for the Ad. Preferably, a header of the signature includes a key identifier that will enable detection of the presence of the signature in the frame, as is well appreciated by those skilled in the art. Further, the hashing function used to compute the signature preferably provides a very small probability of a false match (<0.01%).

Encoding of the digital video source material also includes creation of a meta-stream for the material. The meta-stream includes a header session, (e.g., Ad Identifier, Ad length, and other relevant information), that is multiplexed into the meta-stream by the source device 10 and transmitted using an appropriate encryption algorithm to avoid tampering of the meta-stream contents, i.e., to avoid a maliciously generated meta-stream that yields non valid results. Additionally, the header session includes a play-out schedule for the digital video material, (e.g., the Ad Identifier and a time that the Ad is scheduled to play).

A play-out device 20 receives the incoming program data with the encoded digital video source material for play-out to a display device 30, e.g., a television. Examples of suitable play-out devices 20 include a cable system, a set-top box, and a computer. The play-out device 20 demultiplexes the incoming program data by well known techniques and captures the meta-stream in order to initiate computation of the signature for the incoming digital video data (step 110).

Because of the high bit rate requirements for the distribution of high quality video/audio, a compression scheme can be used to significantly reduce the bandwidth requirements (e.g. MPEG-2 can achieve 1:100 compression ratio). Additionally the usage of high efficient modulation schemes (e.g., QAM, QPSK, VSB) allows for several compressed video streams to be multiplexed over the same analog channel. In the MPEG-2 standard, a built-in multiplexing scheme (Transport Stream) provides the facilities for such multiplexing, where each video stream is packetized (into 188 byte packets) and a range of PID (packet identifiers) are assigned for each program, as is well understood by those skilled in the art.

The preferred embodiment uses a MPEG-2 demultiplexer that is capable of receiving (de-multiplexing) all the individual programs that are multiplexed over the MPEG-2 Transport Stream. A real time parser removes the transport layer (Packet header, adaptation field, etc.), extracting the video PES layer.

A signature engine in the video play-out device 20 parses the video PES layer (removing PES headers) and computes signatures utilizing the video payload, so that for each flame (I, B, and P) a signature is computed. Appropriately, the hashing function used to compute the signature at the play-out device 20 is the same as the one used in the source device 10. Once the signature is computed, it is stored in a local storage associated for each individual program.

The meta-stream is then utilized to determine statistics related to the play-out of the digital video data (step 120). When the video data is received by the play-out device, the hidden data is detected on a minimum of a frame basis. By detecting the hidden data, the number of frames there were correctly decoded is computed, and therefore, with a very high probability, the video data is considered to have played-out correctly (i.e., been a visible image). Further, with the detection of the hidden data at the start and end of the video data, validation that the entire video data actually played-out results. By way of example, the Ads scheduler information is utilized to trigger a matching engine, i.e., to trigger the start of a comparison between the incoming signatures of the digital video in the hidden data with the ones stored. Thus, computation of the statistics includes computing a number of frames that have the correct signature, the time the video material was effectively played, the video material duration, etc. The statistics determined are preferably stored on a non-volatile local storage of the play-out device 20. The play-out play-out statistics can then be automatically analyzed through desired application programming for quality of service measurements (step 130). Preferably, the statistics collected are transmitted back to the program source 10 using an encryption scheme in keeping with the one used by the program source 10 for analysis.

Through the present invention, determining statistics on a particular video program 11 occurs in a manner that avoids intensive manual human monitoring and provides a more efficient and automatic ability to achieve quality of service measurements. The present invention utilizes technology to embed hidden data into a video or associate data with the video file, and provides the ability to take correlated hidden data and video images together that an application can then process to do applications such as billing, quality of service measurements, rights management, and external device control. The hidden data can be put into the video image side bands, user data or other location that is transparent to the video image.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A system for monitoring quality of service of play out of a digital video program, the system comprising:
   a program source to,
   encode each frame of the digital video program with a first unique signature that identifies the frame as being associated with the digital video program;
   create a meta-stream for the digital video program, the meta-stream including a play-out schedule for the digital video program and a length of the digital video program; and
   prior to play-out of the digital video program, transmit the meta-stream to a play-out device; and
   the play-out device to compute statistics associated with play-out of the digital video program, the play-out device including,
   a signature engine to generate a second unique signature for each frame of the digital video program being played out; and
   a matching engine to compare the second unique signature generated for each frame with a corresponding first unique signature encoded with the frame, compare a time of the play-out of the digital video program with a time specified in the play-out schedule, and compare an actual duration of the play-out of the digital video program with the length of the digital video program specified in the meta-stream.

2. The system of claim 1, wherein the play-out device includes a non-volatile local storage to store the computed statistics.

3. The system of claim 2, wherein the play-out device is operable to run a quality of service application for automatically analyzing the computed statistics.

4. The system of claim 1, wherein the program source encodes each frame of the digital video program with a first unique signature using a hashing function.

5. The system of claim 4, wherein the hashing function used by the program source to encode each frame with a first unique signature is also used by the signature engine for generating the second unique signature for each frame of the digital video program being played out.

6. The system of claim 1, wherein the program source transmits the meta-stream to a play-out device using an encryption algorithm.

7. The system of claim 1, wherein the digital video program is distributed to the play-out device from the program source in accordance with MPEG-2 compression.

8. The system of claim 1, wherein the program source places the unique first signature associated with a given frame of the digital video program into video image side bands of the frame.

9. The system of claim 1, wherein the program source combines the digital video program and the meta-stream into a program stream to be distributed to the play-out device.

10. The system of claim 1, wherein the play-out device comprises one of a cable system, a set-top box, or a computer.

11. A computer program product system for monitoring quality of service of play out of a digital video program the system comprising first and second computer readable mediums:

the first computer readable medium including instructions for;

encoding each frame of the digital video program with a first unique signature that identifies the frame as being associated with the digital video program;

creating a meta-stream for the digital video program, the meta-stream including a play-out schedule for the digital video program and a length of the digital video program;

prior to play-out of the digital video program, transmitting the meta-stream to a play-out device; and responsive to the play-out device playing out the digital video program, the play-out device computing statistics associated with the play-out of the digital video program on the second computer readable medium; the second computer readable medium including instructions for;

generating a second unique signature for each frame of the digital video program being played out;

comparing the second unique signature generated for each frame with a corresponding first unique signature encoded with the frame;

comparing a time of the play-out of the digital video program with a time specified in the play-out schedule; and comparing an actual duration of the play-out of the digital video program with the length of the digital video program specified in the meta-stream.

12. The computer program product system of claim 11, further comprising instructions for storing the computed statistics on a non-volatile local storage of the play-out device.

13. The computer program product system of claim 12, further comprising instructions for automatically analyzing the computed statistics using a quality of service measurement application.

14. The computer program product system of claim 11, wherein the instructions for encoding each frame of the digital video program with a unique first signature comprises instructions for using a hashing function to compute each first unique signature.

15. The computer program product system of claim 14, wherein the hashing function used to compute each first unique signature is also used for generating the second unique signature for each frame of the digital video program being played out.

16. The computer program product system of claim 11, wherein the instructions for transmitting the meta-stream to a play-out device comprises instructions for transmitting the meta-stream to the play-out device using an encryption algorithm.

17. The computer program product system of claim 11, wherein the digital video program is distributed to the play-out device in accordance with MPEG-2 compression.

18. The computer program product system of claim 11, wherein the instructions for encoding each frame of the digital video program with a unique first signature comprises instructions for placing the unique first signature into video image side bands associated with a given frame of the digital video program.

19. The computer program product system of claim 11, wherein the digital video program and the meta-stream are combined into a program stream to be distributed to the play-out device.

20. The computer program product system of claim 11, wherein the play-out device comprises one of a cable system, a set-top box, or a computer.

* * * * *

UNITED STATES PATENT AND TRADEMARK OFFICE
CERTIFICATE OF CORRECTION

| | | |
|---|---|---|
| PATENT NO. | : 7,617,509 B1 | Page 1 of 1 |
| APPLICATION NO. | : 09/602278 | |
| DATED | : November 10, 2009 | |
| INVENTOR(S) | : Brunheroto et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1567 days.

Signed and Sealed this

Nineteenth Day of October, 2010

David J. Kappos
*Director of the United States Patent and Trademark Office*